United States Patent
Bertholdt et al.

[11] Patent Number: 5,835,865
[45] Date of Patent: Nov. 10, 1998

[54] METHOD AND DEVICE FOR THE DISPOSAL OF A CATION EXCHANGER

[75] Inventors: Horst-Otto Bertholdt, Forchheim; Rainer Gassen, Fuerth, both of Germany

[73] Assignee: Siemens Aktiengesellschaft, Munich, Germany

[21] Appl. No.: 779,368

[22] Filed: Jan. 6, 1997

Related U.S. Application Data

[63] Continuation of PCT/DE95/00802, Jun. 21, 1995.

[30] Foreign Application Priority Data

Jul. 4, 1994 [DE] Germany .................. 44 23 398.1

[51] Int. Cl.$^6$ .......................................... G21F 9/00
[52] U.S. Cl. .................. 588/1; 210/673; 210/674; 210/751; 210/759; 376/313; 423/6; 134/10
[58] Field of Search .................. 588/1, 20; 210/672, 210/673, 674, 682, 751, 759; 376/313; 423/6; 134/10

[56] References Cited

U.S. PATENT DOCUMENTS

| | | |
|---|---|---|
| 2,694,681 | 11/1954 | Bray et al. . |
| 3,262,883 | 7/1966 | Fisher ................................. 252/184 |
| 3,340,200 | 9/1967 | Noble ................................. 521/26 |
| 3,454,503 | 7/1969 | Blankenhorn et al. .............. 521/26 |
| 3,732,191 | 5/1973 | Kuhajek et al. ..................... 521/26 |
| 3,887,498 | 6/1975 | Kuhajek et al. . |
| 4,156,646 | 5/1979 | Schulz . |
| 4,235,713 | 11/1980 | Diaz Nogueira et al. .......... 210/638 |
| 5,139,734 | 8/1992 | Corpora et al. ..................... 376/310 |

FOREIGN PATENT DOCUMENTS

| | | |
|---|---|---|
| 1257692 | 12/1967 | Germany . |
| 2735460 | 2/1978 | Germany . |
| 2934863A1 | 4/1981 | Germany . |
| 3007716A1 | 9/1981 | Germany . |
| 3102473A1 | 12/1981 | Germany . |
| 3517400A1 | 12/1985 | Germany . |
| 3427258C2 | 1/1992 | Germany . |
| 4137947A1 | 5/1993 | Germany . |
| 1456457 | 11/1976 | United Kingdom . |
| 1533955 | 11/1978 | United Kingdom . |
| 2133607 | 7/1982 | United Kingdom . |
| 2142773 | 1/1985 | United Kingdom . |
| 2229312 | 9/1990 | United Kingdom . |

OTHER PUBLICATIONS

Derwent Publication No. 87–089430.
Derwent Publication No. 84–266387.
Japanese Patent Abstract No. 63–16829 (Kusaka), dated Aug. 3, 1989.

*Primary Examiner*—Ngoclan Mai
*Attorney, Agent, or Firm*—Herbert L. Lerner; Laurence A. Greenberg

[57] ABSTRACT

A cation exchanger is loaded only with radioactive cations by repeatedly converting the non-bivalent, inactive cations into anionic complexes and flushing the complexes out of the cation exchanger. The cation exchanger, which may be integrated in a primary system of a nuclear power plant, is connected to a feed line for a complexing agent and to a discharge line through which the anionic complexes are flushed from the exchanger.

15 Claims, 1 Drawing Sheet

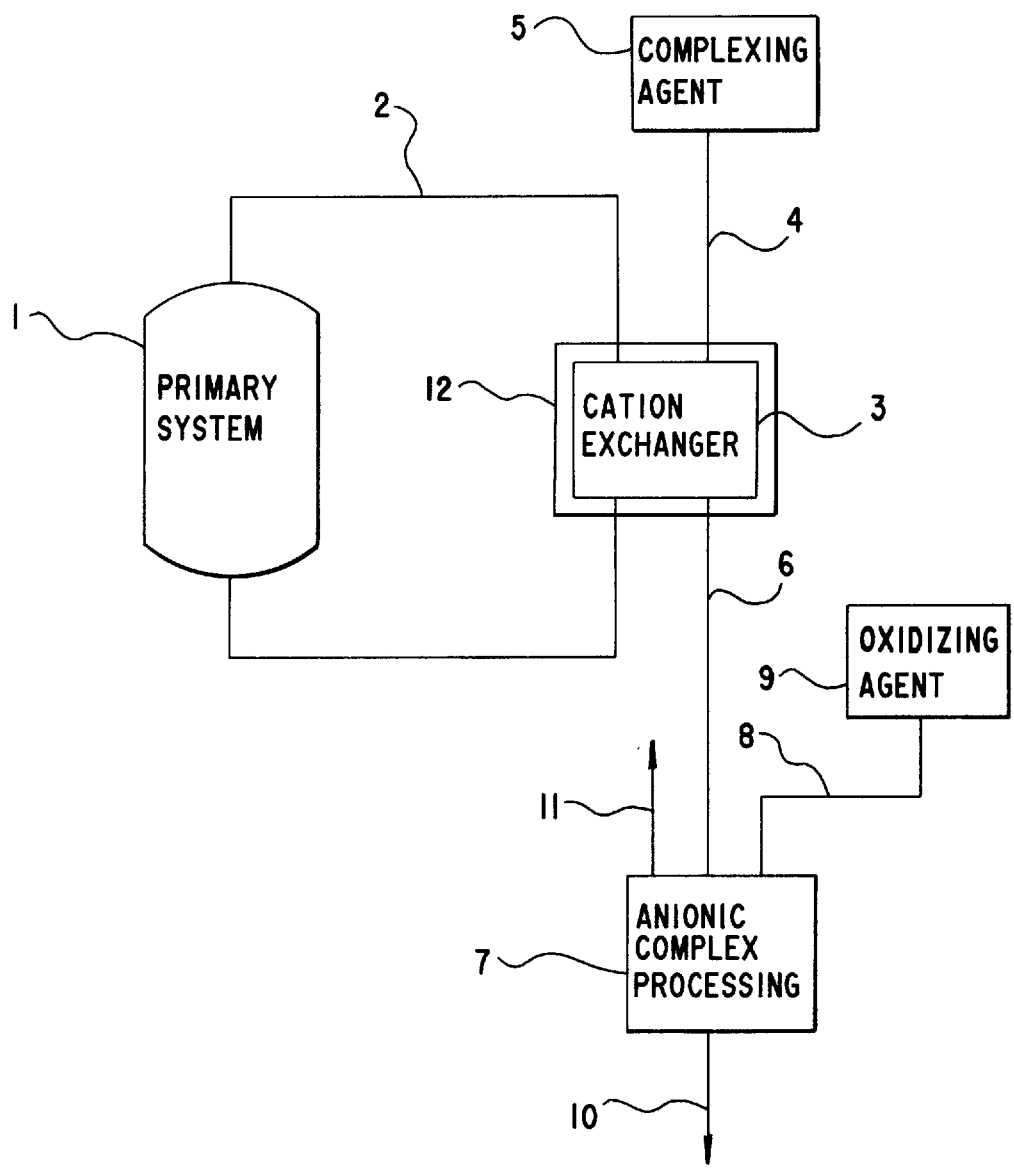

METHOD AND DEVICE FOR THE DISPOSAL OF A CATION EXCHANGER

CROSS-REFERENCE TO RELATED APPLICATION

This is a continuation of international application PCT/DE95/00802, filed Jun. 21, 1995, which designated the United States.

BACKGROUND OF THE INVENTION

Field of the Invention

The invention relates to a method for the disposal of a cation exchanger contaminated with radioactive and inactive cations. The invention also relates to a device for the disposal of such a cation exchanger.

Cation exchangers are utilized in performing decontamination processes in nuclear power plants. The cations that arise as a result during decontamination are thereby retained in the cation exchangers. After regular decontamination, the cation exchanger contains radioactive and inactive cations. The radioactive cations are cobalt 60, cobalt 58, manganese 54 and/or chromium 51. However, other radioactive cations may also be present. The inactive cations are generally iron and nickel.

The contaminated cation exchanger is left over after decontamination of a plant. The contaminated resins contained in the cation exchanger must be disposed of. To this end, they are removed from the cation exchanger container and further treated for ultimate storage. The stages of the procedure until the ultimate place of disposal is reached are time-consuming and costly because the resins contain radioactive substances.

Due to the fact that a large quantity of cations arise in a regular decontamination process, a large quantity of resin must be disposed of and removed to an ultimate storage place.

SUMMARY OF THE INVENTION

It is accordingly an object of the invention to provide a method and device for the disposal of a cation exchanger, which overcomes the above-mentioned disadvantages of the heretofore-known devices and methods of this general type and which ensures that the least possible amount of resin containing radioactive cations arises which may therefore be stored safely in an ultimate storage place. It is a further object of the invention to propose a suitable device for the disposal of a cation exchanger.

With the foregoing and other objects in view there is provided, in accordance with the invention, a method of loading and disposing of a cation exchanger, which comprises:

contaminating a resin of a cation exchanger with radioactive and inactive cations;

selectively regenerating the cation exchanger by converting only the non-bivalent, inactive cations into anionic complexes and flushing the anionic complexes from the cation exchanger; and repeating the contaminating step, and subsequently storing the resin of the cation exchanger in an ultimate disposal site.

In other words, the above objects of the invention are attained in that the inactive cations that are not bivalent are converted into anionic complexes and these complexes are flushed out of the cation exchanger.

The cation exchanger is thereby selectively regenerated. This is because the radioactive cations present in the cation exchanger are all bivalent and are therefore retained in the cation exchanger. The fact that the inactive cations are removed from the cation exchanger means that the resin in the cation exchanger again offers more space for a new decontamination process of the cation exchanger. Radioactive and inactive cations thereby enter the cation exchanger again, and only the inactive cations are removed again in a second selective regeneration.

The advantage of alternating between the decontamination process and selective regeneration is that the cation exchanger can be operated until such a time that it is contaminated almost exclusively with radioactive cations. Since its capacity is not restricted by large quantities of inactive cations, it offers more space for radioactive cations and can therefore be used for very long periods of time. Advantageously, in one time interval, very little resin develops that has to be forwarded to an ultimate storage place. As a result, a very small ultimate storage place is sufficient.

The anionic complexes that have been flushed out of the cation exchanger contain no radioactive components. They can therefore be disposed of in a simple manner. For example, it is possible for the solution with the complexes to be evaporated.

In a decontamination process, inactive bivalent iron cations can first be formed. However, these are already oxidized through existing small quantities of atmospheric oxygen to form trivalent iron cations. In this way, the inactive iron cations, which represent a large portion of the inactive cations, do not exist as bivalent cations and are converted into an anionic complex.

In accordance with an added feature of the invention, an oxidizing agent, for example a small quantity of hydrogen peroxide, can be added so as to support the oxidation of the bivalent iron cations.

The inactive cations are converted into anionic complexes at, for example, a temperature greater than 20° C. In particular, the conversion occurs at a temperature between 60° C. and 80° C. At these temperatures, the conversion is particularly favorable.

In accordance with an addition feature of the invention, a complexing agent is introduced into the contaminated cation exchanger, whereby the inactive cations are converted into anionic complexes.

The complexing agent converts into complexes only those cations that are not bivalent. Of the cations present in a cation exchanger after a decontamination process, only the active cations are bivalent. Through the utilization of the complexing agent, the cation exchanger is selectively regenerated as only the inactive cations are converted into anionic complexes, while the radioactive cations remain bonded to the resin of the cation exchanger.

In accordance with another feature of the invention, oxalic acid is used as the complexing agent. This forms oxalate complexes, e.g. an iron oxalic complex, with the inactive cations, e.g. with trivalent iron.

One particularly suitable complexing agent is, for example, an oxalic acid solution that contains more than 0.1 mol oxalic acid. A 1 mol oxalic acid is particularly suitable.

The advantage of using oxalic acid is that the cation exchanger can be used again for decontamination immediately after the selective regeneration.

Any remaining oxalic acid in the cation exchanger does not affect the decontamination process. Advantageously, the cation exchanger does not have to undergo the costly process of being flushed out after the selective regeneration.

The advantage of selecting a suitable concentration of oxalic acid is that, on the one hand, the quantity of oxalic acid fed into the cation exchanger is sufficient for the selective regeneration while, on the other hand, the quantity of the oxalic acid solution fed in is adapted to the capacity of the cation exchanger.

The anionic complexes flushed out of the cation exchanger can be destroyed in an oxidative manner. In a subsequent step of the procedure, hydrogen peroxide and/or ozone can be added to the anionic complexes. Such an oxidative destruction of the complexes results in carbon dioxide, which can be released. Another result is a solution containing the inactive cations. Such a solution does not require any costly disposal procedures.

An advantage of the method in accordance with the invention is, in particular, that a cation exchanger resin that contains radioactive and inactive cations after a decontamination procedure can be selectively regenerated, i.e. the resin is released of the inactive cations, while the radioactive cations remain bonded to the resin. Therefore, more radioactive cations can advantageously remain connected to the same quantity of resin through the selective regeneration. This results in fewer resins contaminated with radioactive cations, and, as a result, only a small ultimate storage place need be provided for such resins.

With the above and other objects in view, there is also provided, in accordance with the invention, an improved cation exchanger assembly, the cation exchanger being contaminated with radioactive and inactive cations. The improvement comprises a feed line for a complexing agent leading into the cation exchanger, and a discharge line for anionic complexes leading from the cation exchanger.

On completion of a decontamination cycle, a complexing agent is fed via the feed line for selective regeneration of the cation exchanger. Since the cation exchanger cannot retain any anions, the anionic complexes of the inactive cations then formed in the cation exchanger are released through the discharge line. More space is then formed in the cation exchanger and the exchanger is ready to accept more cations during a second decontamination cycle.

The discharge line of the cation exchanger is connected, for example, to a processing unit into which a line for an oxidizing agent discharges. The complexes can be destroyed in the processing unit. The procedure results in carbon dioxide, which is released, and in inactive cations in a solution, which can be easily disposed of.

The cation exchanger is disposed, for example, in a container suitable for ultimate storage. The advantage of this is that the entire cation exchanger can be brought to an ultimate storage location when it is completely contaminated with radioactive cations. Advantageously, no direct contact is made with the contaminated resin of the cation exchanger. The resin does not need to be removed from the cation exchanger.

The advantage of the device in accordance with the invention, as with the method in accordance with the invention, is that the space required for ultimate storage of the cation exchanger resin is extremely small.

Other features which are considered as characteristic for the invention are set forth in the appended claims.

Although the invention is illustrated and described herein as embodied in a method and device for the disposal of a cation exchanger, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The sole FIGURE is a schematic of a device for the disposal of a cation exchanger.

DESCRIPTION OF THE PREFERRED EMBODIMENTS

Referring now more specifically to the sole FIGURE of the drawing, there is shown a system 1 which is to be decontaminated. The system may, for instance, be a primary system of a nuclear power plant. For decontamination, a previously supplied decontamination solution is fed through a decontamination circuit 2 to which a cation exchanger 3 is connected. Both radioactive cations and inactive cations are retained in the cation exchanger 3.

In order to dispose of the cation exchanger 3, it is first closed off from the decontamination circuit 2. Then a complexing agent is fed into the cation exchanger 3 through a feed line 4 from a complexing agent container 5. The inactive cations are converted with the complexing agent, into anionic complexes, which then leave the cation exchanger 3.

The solution containing the complexes leaves the cation exchanger 3 through a line 6 and enters a processing unit 7. In order to process the complexes, an oxidizing agent is fed from an oxidizing agent container 9 into the processing unit 7 via a line 8. Processing unit 7 has a discharge line 10 for a solution that contains no radioactive substances and a discharge line 11 for a gas, e.g. carbon dioxide.

After a decontamination process and a selective regeneration of the cation exchanger 3 have alternated one or more times, the resin of the cation exchanger 3 contains almost only radioactive cations. The resin has therefore been used optimally for the removal of radioactive cations. The resin can then be brought to an ultimate storage place. Through optimal utilization of the resin, only a very small ultimate storage place is required for the resin.

The cation exchanger 3 may be disposed in a container 12 which is suitable for ultimate storage. In this way, there is no need to move the contaminated resin to a special ultimate storage container. Instead, the entire cation exchanger 3 is brought to the ultimate disposal site and replaced by a new cation exchanger 3. In this way, personnel does not come into direct contact with the contaminated resin.

We claim:

1. A method of loading and disposing of a cation exchanger, which comprises:

contaminating a resin of a cation exchanger with radioactive and inactive cations;

selectively regenerating the cation exchanger by converting only the inactive cations into anionic complexes and flushing the anionic complexes out of the cation exchanger;

oxidizing and destroying the anionic complexes flushed out of the cation exchanger; and repeating the contaminating step, and subsequently storing the resin of the cation exchanger in an ultimate disposal site.

2. The method according to claim 1, which comprises alternatingly repeating the contaminating and regenerating step multiple times prior to the storing step.

3. The method according to claim 1, wherein the regenerating step comprises oxidizing bivalent iron cations to form trivalent iron cations and subsequently converting the trivalent iron cations into anionic complexes.

4. The method according to claim 3, wherein the oxidizing step comprises subjecting the bivalent iron cations to an oxidizing agent.

5. The method according to claim 4, wherein a small quantity of hydrogen peroxide is used as the oxidizing agent.

6. The method according to claim 1, wherein the converting step comprises converting the inactive cations into anionic complexes at a temperature above 20° C.

7. The method according to claim 1, wherein the converting step comprises converting the inactive cations into anionic complexes at a temperature between 60° C. and 80° C.

8. The method according to claim 1, wherein the regenerating step comprises introducing a complexing agent into the contaminated cation exchanger and thereby converting the inactive cations into anionic complexes.

9. The method according to claim 8, which comprises introducing oxalic acid as the complexing agent.

10. The method according to claim 9, which comprises introducing a solution containing more than 0.1 mol oxalic acid.

11. The method according to claim 9, which comprises introducing a solution containing 1 mol oxalic acid.

12. The method according to claim 1, which comprises adding one or more oxidizing agents selected from the group consisting of hydrogen peroxide and ozone to the anionic complexes and thereby destroying the anionic complexes.

13. An improved cation exchanger assembly, the cation exchanger being contaminated with radioactive and inactive cations, the improvement which comprises:

a feed line for a complexing agent leading into the cation exchanger, and a discharge line for anionic complexes leading from the cation exchanger; and a processing unit for oxidizing the anionic complexes and a line for feeding oxidizing agent into said processing unit, said discharge line issuing into said processing unit.

14. The assembly according to claim 13, which further comprises a container suitable for ultimate disposal, said cation exchanger being disposed in said container.

15. In a nuclear power plant with a primary system, a cation exchanger assembly connected in the primary system and receiving from the primary system radioactive and inactive cations, comprising:

a flushing system for regenerating the cation exchanger, said system including a feed line for a complexing agent leading into the cation exchanger, and a discharge line for anionic complexes leading from the cation exchanger; and a processing unit for oxidizing the anionic complexes and a line for feeding oxidizing agent into said processing unit, said discharge line issuing into said processing unit.

* * * * *